(12) United States Patent
Atake

(10) Patent No.: US 6,220,849 B1
(45) Date of Patent: Apr. 24, 2001

(54) SHEET-DECORATING INJECTION MOLDING MACHINE

(75) Inventor: Hiroyuki Atake, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/253,532

(22) Filed: Feb. 22, 1999

(30) Foreign Application Priority Data

Feb. 20, 1998 (JP) .................................................. 10-038593

(51) Int. Cl.$^7$ .................................................. B29C 45/16
(52) U.S. Cl. .......................................... 425/511; 425/513
(58) Field of Search .................................. 425/135, 266, 425/267, 269, 511, 513, 112, 126.1

(56) References Cited

U.S. PATENT DOCUMENTS

| 4,639,341 | 1/1987 | Hanamoto et al. . |
| 4,686,076 | 8/1987 | Dromigny et al. . |
| 5,096,652 | 3/1992 | Uchiyama et al. . |

FOREIGN PATENT DOCUMENTS

| 50-19132 | 7/1975 | (JP) . |
| 3-56344 | 12/1991 | (JP) . |
| 5-318523 | 12/1993 | (JP) . |
| 7-41637 | 5/1995 | (JP) . |
| 7-241873 | 9/1995 | (JP) . |
| 9-39025 | 2/1997 | (JP) . |

Primary Examiner—Tim Heitbrink
(74) Attorney, Agent, or Firm—Parkhurst & Wendel, L.L.P.

(57) ABSTRACT

A sheet-decorating injection molding machine (10) comprises: a female mold (12) having a hollow (13) and a parting surface (14) surrounding the hollow (13); a male mold (25) disposed opposite to the female mold (12) to hold a decorative sheet (S) between the female and the male mold (12, 25) and provided with runners (27) and gates (28) through which a molten resin is injected into a cavity defined by the female mold (12) and the male mold (25). The parting surface (14) of the female mold (12) includes a substantially convex, curved surface. A sheet feed mechanism (5) comprises a driving-and-guiding mechanism including sprocket wheels (41, 42, 43, 44, 45) and a stepping geared motor (52). The sheet feed mechanism (5) reciprocates a section of endless chains (50) provided with sheet grippers (60) holding a decorative sheet (S) for one injection molding cycle between a waiting position where the sheet grippers (60) are positioned apart from the female mold (12), and a feed position where the sheet grippers (60) are located on the parting surface of the female mold (12). The decorative sheet (S) is moved so as to extend along the parting surface (14).

14 Claims, 13 Drawing Sheets

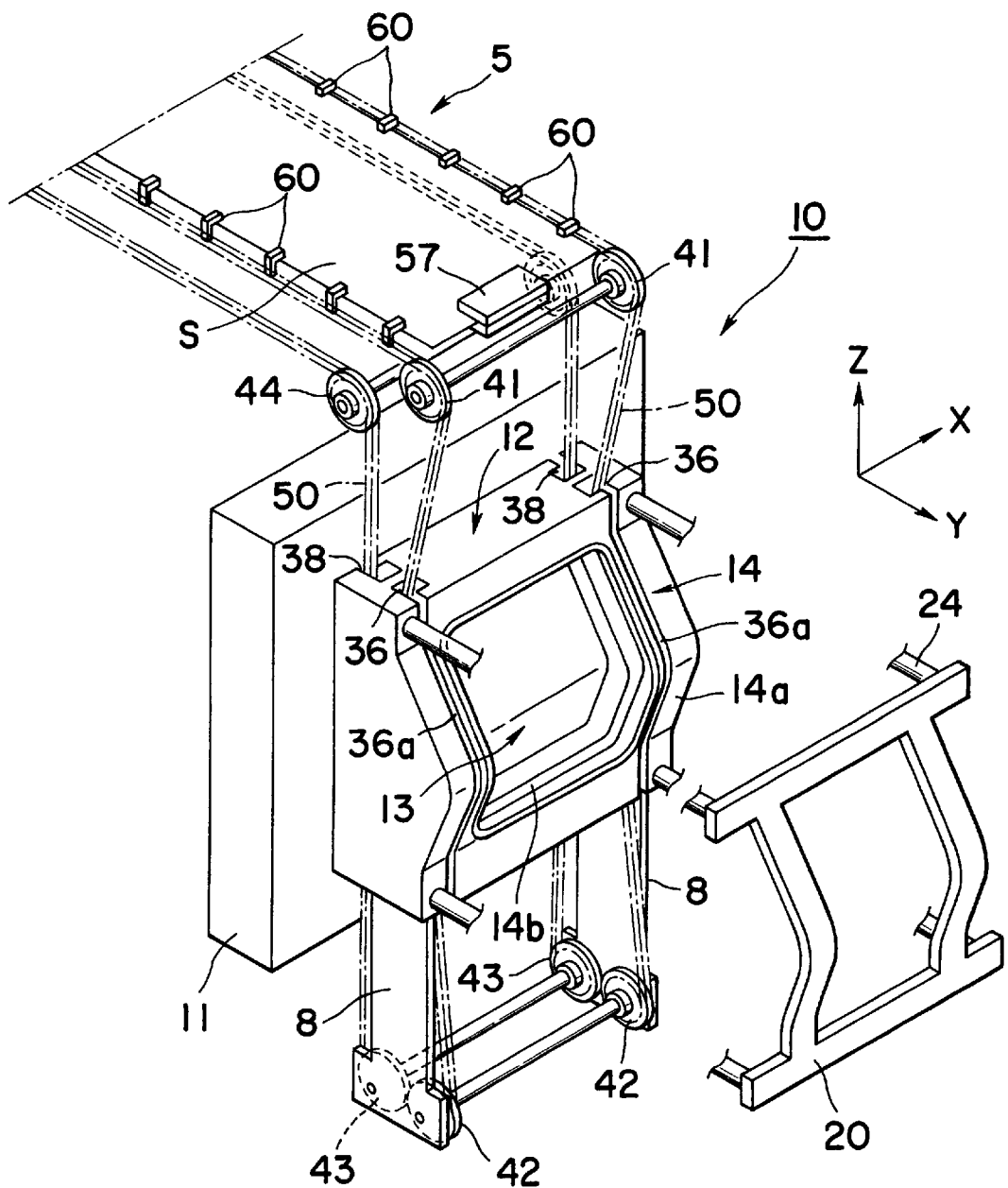
F I G. 2

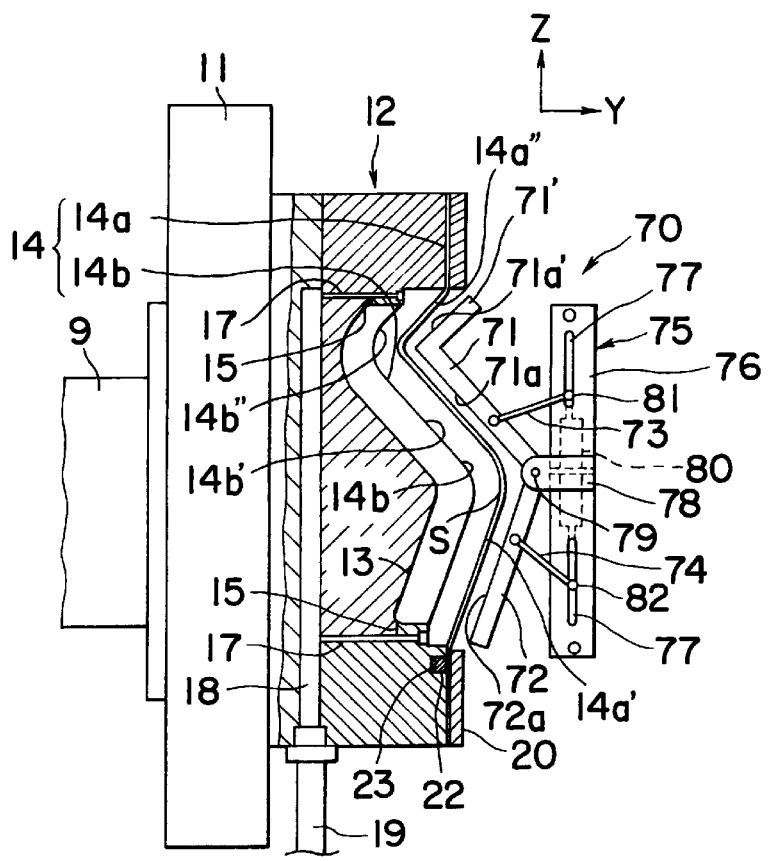
F I G. 16
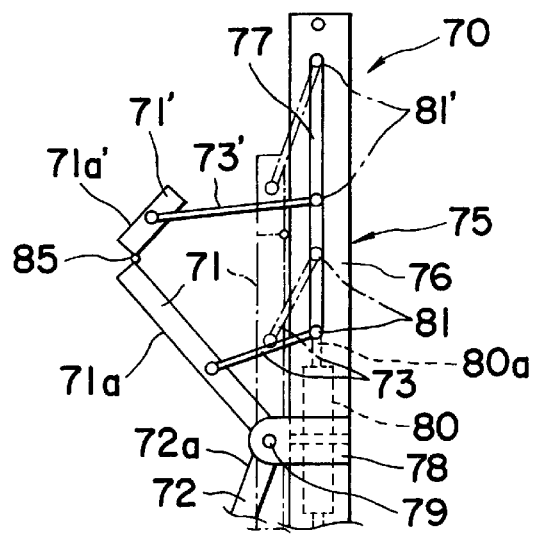
F I G. 17

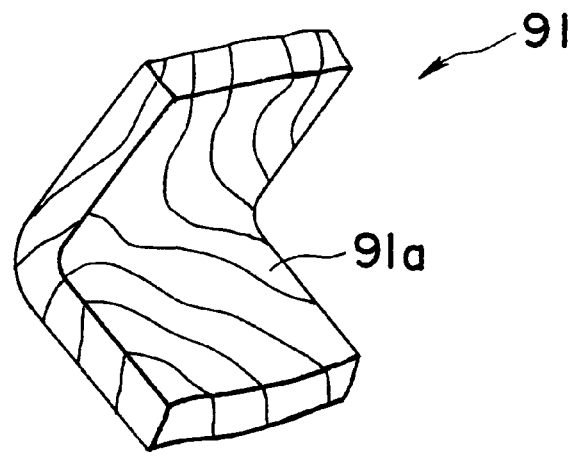
F I G. 18A
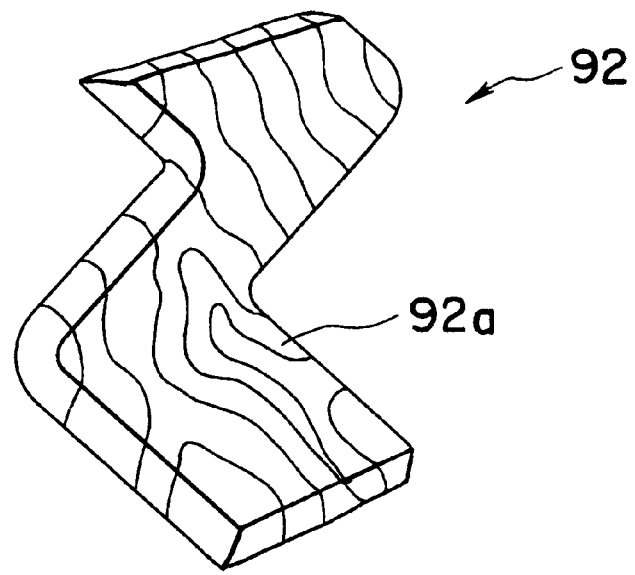
F I G. 18B

SHEET-DECORATING INJECTION MOLDING MACHINE

BACKGROUND OF THE INVENTION

1. Field of the Invention

The present invention relates to a sheet-decorating injection molding machine capable of simultaneously forming a resin molding and a decorative pattern on a surface of the resin molding in a mold by injection molding. More particularly, the present invention relates to a sheet-decorating injection molding machine capable of laminating a decorative sheet printed with patterns, letters and/or the like to a surface of a resin molding formed by injection molding for decoration.

2. Description of the Related Art

Various sheet-decorating injection molding methods, which simultaneously carries out forming a resin molding by injection molding and laminating a decorative sheet to a surface of the resin molding, have been proposed. Most of those known sheet-decorating injection molding methods comprises all or some of the following steps (a) to (i). These steps are performed sequentially or some of the steps are performed simultaneously or in parallel to each other (Refer to JU-B No. 3-56344 and JP-B Nos. 50-19132 and 7-41637).

(a) A sheet feeding step of feeding a decorative sheet onto the parting surface of the female mold of a mold for injection molding;

(b) A sheet holding step of fixedly holding a decorative sheet on the parting surface of the female mold;

(c) A sheet softening step of softening the decorative sheet by heating the decorative sheet with a heating plate or the like;

(d) A sheet drawing step of drawing the decorative sheet by suction and/or pneumatic pressing so that the decorative sheet conform to a surface defining a hollow in the female mold;

(e) A mold clamping step of moving the female mold toward the male mold of the mold or moving the male mold toward the female mold (the female mold is moved toward the male mold in most cases) to close and clamp the mold;

(f) An injection molding step of injecting a fluidic resin (molten resin) through the male mold in to a cavity defined by the male and the female mold and solidifying the resin in the cavity;

(g) A mold opening step of separating the female mold and the male mold from each other to open the mold;

(h) A sheet trimming step of severing marginal portions of the decorative sheet from a portion of the decorative sheet to be attached to a molding formed by injection molding; and (i) An ejecting step of ejecting a sheet-decorated molding (product) decorated by the decorative sheet from the female or the male mold.

The simultaneous performance of the plurality of steps signifies the performance of the plurality of steps in a single process. More specifically, the decorative sheet is fixedly held between the male and the female mold in the mold clamping process (e) to carry out the sheet holding step (b) and the mold clamping step (e) simultaneously, or the decorative sheet is drawn by the heat and pressure of the molten resin in the injection molding step (f) to carry out the sheet drawing step (d) and the injection molding step (f) simultaneously.

A laminate decorative sheet or a transfer decorative sheet is used as the decorative sheet depending on the type of the product. When a laminate decorative sheet is used, the laminate decorative sheet is incorporated entirely into a molding during injection molding to form a decorative layer on the surface of the molding. When a transfer decorative sheet is used as the decorative sheet, the base sheet of the transfer decorative sheet incorporated into the surface of a molding is peeled off to leave a transfer layer on the molding to form a decorative layer.

SUMMARY OF THE INVENTION

In the sheet-decorating injection molding method, the sheet feeding step (a) of feeding a decorative sheet onto the parting surface of the female mold of a mold for injection molding is indispensable. Efforts have been made to automate the sheet feeding step. A decorative sheet feeding method disclosed in JP-A No. 5-318523 (sheet feeding method (1)) uses a decorative sheet feed device and a takeup device, and unwinds a rolled decorative web to feed a fixed length of the decorative web necessary for one injection molding cycle, i.e., a decorative sheet, at a time. A decorative sheet feeding method disclosed in JP-A No. 7-241873 (sheet feeding method (2)) uses a sheet conveying mechanism provided with sheet grippers, such as chucks, capable of gripping a leading edge part or opposite side edge parts of a decorative sheet to feed a decorative sheet.

Problem does not arise in these sheet feeding methods (1) and (2) in stably and efficiently feeding a decorative sheet onto the parting surface of the female mold if the parting surface is flat. However, a sheet-decorating injection molding machine is often required to use a female mold having a generally convex or concave parting surface according to the shape of a sheet-decorated product to be molded.

For example, if a decorative sheet held on a flat parting surface is drawn so as to conform the surface of a hollow having the shape of a deep drawing die when forming a product having a curved surface of large curvatures, such as the surface of an article formed by deep drawing, by sheet-decorating injection molding, the decorative sheet is displaced and strained greatly and the decorative sheet is liable to be creased, strained and torn. If forming conditions including the intensity of heat and the level of pressure, are reduced to avoid creasing, straining and tearing the decorative sheet, it is difficult to draw the decorative sheet so as to extend in perfectly close contact with the surface of the hollow.

A sheet-decorating injection molding machine proposed in, for example, JP-A No. 9-39025 to solve such a problem uses a female mold having a generally concave, curved parting surface corresponding to the shape of a product to be formed in order that the depth of the hollow of the female mold, i.e., depth from the parting surface, need not be very great even in molding a product having a curved surface of large curvatures.

As mentioned above, the sheet feeding methods (1) and (2) move a decorative sheet in a plane when feeding the decorative sheet onto the generally concave, curved parting surface of a female mold. Therefore, the decorative sheet cannot properly be extended so as to conform the concave, curved parting surface of the female mold, a large space is formed between the decorative sheet and the parting surface and, consequently, the following sheet holding step and the drawing step cannot properly carried out.

The sheet-decorating injection molding machine disclosed in JP-A No. 9-39025 is provided with a sheet feed means for feeding a decorative sheet onto the concave, curved parting surface of a female mold, comprising a pair of flexible, elongate sheet conveying members, such as chains, ropes or belts, provided with sheet grippers for gripping opposite side edge parts of a decorative sheet. The sheet conveying members are moved along guide grooves formed in the female mold having the concave, curved parting surface to extend the decorative sheet held by the sheet grippers along the concave, curved parting surface of the female mold.

Although this known sheet feed means is able to extend the decorative sheet along the concave, curved parting surface, the sheet conveying members cannot substantially be tensioned because the sheet conveying members have free front ends, the sheet conveying members are simply unwound to feed the decorative sheet and the same are taken up after the decorative sheet has been fed onto the concave, curved parting surface of the female mold. Accordingly, it is difficult to position the sheet conveying members and the sheet grippers of the sheet feed means, the sheet conveying members and the sheet grippers held on the sheet conveying members cannot stably be moved into and moved out of the guide grooves and, consequently, it is possible that the decorative sheet cannot smoothly be fed onto the concave, curved parting surface. Generally, a female mold (movable mold) of a mold is moved toward and away from a male mold (stationary mold) of the mold to close and open the mold. Therefore, if the position of the sheet feed means is fixed or the sheet feed means and the female mode are separate from each other, the sheet grippers held on the sheet conveying members are unable to move smoothly into the guide grooves formed in the female mold if the female mold is dislocated from a correct initial position, i.e., a position where the female mold is held when the mold is opened. Consequently, it is possible that the decorative sheet cannot smoothly be conveyed and the connection of the decorative sheet to a molding cannot properly be achieved.

The present invention has been made to solve such a problem and it is therefore an object of the present invention to provide a sheet-decorating injection molding machine capable of stably and efficiently feeding a decorative sheet, of preventing the excessive displacement and distortion of a decorative sheet during a sheet drawing step even if a female mold has a generally convex, curved parting surface and of smoothly and quickly feeding a decorative sheet.

With the foregoing object in view, according to a first aspect of the present invention, a sheet-decorating injection molding machine comprises a female mold having a hollow and a parting surface surrounding the hollow, a male mold disposed opposite to the female mold to hold a decorative sheet between the female and the male mold and provided with a gating system through which a molten resin is injected into a cavity defined by the female mold and the male mold, sheet feed means for feeding a decorative sheet onto the parting surface of the female mold so as to cover the hollow of the female mold, and sheet holding means for holding a decorative sheet on the parting surface of the female mold, in which the parting surface of the female mold include a substantially convex, curved section, and the sheet feed means moves a decorative sheet so that the decorative sheet extends along the parting surface of the female mold.

In this sheet-decorating injection molding machine, it is preferable that the sheet feed means comprises a pair of sheet conveying members extended on the opposite sides of a sheet feed passage, respectively, and capable of being bent in curves, sheet grippers attached to the sheet conveying members to grip the opposite side edge parts of a decorative sheet, and driving-and-guiding means for driving and guiding the sheet conveying members so that at least sheet gripping members of the sheet grippers travel along the parting surface of the female mold. Preferably, the sheet conveying members are endless annular members, and the driving-and-guiding means has a plurality of rotating members around which the endless annular members are wound. Preferably, the driving-and-guiding means of the sheet feed means reciprocates the sheet conveying members between a waiting position where the sheet grippers are positioned apart from the female mold, and a feed position where the sheet grippers are located on the parting surface of the female mold.

In this sheet-decorating injection molding machine, it is preferable that the sheet feed means is fixed to the female mold for travel together with the female mold.

In this sheet-decorating injection molding machine, it is preferable that the female mold is provided with a pair of guide grooves extending along the parting surface, and the sheet conveying members move along the guide grooves. Preferably, the guide grooves have a cross section of a shape corresponding to that of a cross section of the sheet conveying members to restrain the sheet conveying members from movement in directions perpendicular to a sheet conveying direction.

It is preferable that this sheet-decorating injection molding machine further comprises tensioning means for tensioning the sheet conveying members in a predetermined tension. Preferably, the tensioning means includes rotating members pressed against the sheet conveying members.

In this sheet-decorating injection molding machine, it is preferable that each of the sheet grippers of the sheet feed means is provided with a sheet releasing means which cooperates with the sheet holding means to make the sheet gripper release a decorative sheet, and that the driving-and-guiding means of the sheet feed means moves the sheet conveying members backward to the waiting position apart from the female mold in a state where the decorative sheet is held on the parting surface of the female mold after the sheet grippers have released the decorative sheet.

It is preferable that this sheet-decorating injection molding machine further comprises a heating device having a heating surface of a shape corresponding to the substantially convex, curved section of the parting surface of the female mold, and capable of being disposed opposite to the parting surface so as to face a decorative sheet fed onto the parting surface of the female mold. Preferably, the heating device comprises a first heating plate having a heating surface and a second heating plate having a heating surface, adjacent ends of the first and the second heating plate are joined together so that the first and the second heating plate are turnable relative to each other to change the angle between the first and the second heating plate, the angle between the first and the second heating plate can be adjusted so that the respective heating surfaces of the first and the second heating plate are at substantially equal distances from the curved parting surface of the female mold, respectively, and the angle between the first and the second heating plate can be increased to about 180° when the heating device is placed at a waiting position apart from the female mold.

In this sheet-decorating injection molding machine, the parting surface of the female mold may have a substantially concave, curved section in addition to the substantially convex, curved section. When the parting surface of the female mold has a substantially convex, curved section and a substantially concave, curved section, it is preferable that the sheet-decorating injection machine further comprises a heating device capable of being disposed opposite to the parting surface of the female mold and having a heating surface of a shape conforming to the substantially convex, curved section and the substantially concave, curved section of the parting surface of the female mold. Preferably, the heating device comprises a first heating plate having a heating surface, a second heating plate having a heating surface and pivotally joined to one end of the first heating plate so that the first and the second heating plate are turnable relative to each other to change the angle between the first and the second heating plate, and a third heating plate having a heating surface and pivotally joined to the other end of the first heating plate so as to be turnable relative to the first heating plate to change the angle between the first and the third heating plate, the angle between the first and the second heating plate can be adjusted so that the respective heating surfaces of the first and the second heating plate are at substantially equal distances from the convex, curved section of the parting surface of the female mold, and the angle between the first and the third heating plate can be adjusted so that the respective heating surfaces of the first and the third heating plate are at substantially equal distances from the substantially concave, curved section of the parting surface of the female mold when the heating device is at a heating position opposite the parting surface of the female mold, and the angle between the first and the second heating plate can be increased to about 180° and the angle between the first and the third heating plate can be decreased to about 180° when the heating device is at a waiting position apart from the female mold.

According to the present invention, since the parting surface of the female mold includes the substantially convex, curved section and the sheet feed means feeds a decorative sheet so that the decorative sheet extends along the parting surface of the female mold, the depth of the hollow of the female from the parting surface need not be very great even if a product to be molded has a surface having large curvatures, such as the surface of a product produced by deep drawing. Therefore, decorative sheet will not easily be creased, strained and torn, the decorative sheet can properly be drawn so as to be in close contact with the surface of the hollow of the female mold, and hence a product of a good quality can surely be molded.

Since the decorative sheet is gripped for conveying by the necessary number of sheet grippers attached to the endless annular members, i.e., the sheet conveying members, the sheet conveying members can properly be tensioned, and the respective positions of the sheet conveying members and the sheet grippers attached to the sheet conveying members relative to the guide grooves of the female mold can definitely be determined. Consequently, the collision of the sheet conveying members or the sheet grippers against the edges of the guide grooves of the female mold or the interference between the sheet conveying members or the sheet grippers, and the edges of the guide grooves of the female mold can effectively be avoided, the sheet conveying members can stably be guided by the guide grooves and hence the decorative sheet can smoothly and quickly be fed.

The female mold, i.e., the movable mold, is movable toward and away from the male mold, i.e., the stationary mold, to close and open the mold. Since the sheet feed means is moved together with the female mold, the sheet conveying member and the sheet grippers attached to the sheet conveying members are able to move into and move out of the guide grooves of the female mold correctly and the decorative sheet can smoothly and stably be fed even if the female mold is dislocated from a correct open position, i.e., an initial position when the same is opened.

In the sheet-decorating injection molding machine of the present invention, the female and the male mold are made of a metal, such as ion, or a ceramic material and, if necessary, are provided with small holes for suction and blowing compressed air. The female mold may be a split mold of an insert construction formed by assembling a plurality of component pieces, and the parts may be assembled with gaps between the adjacent parts to use the gaps as suction slits. It is desirable to form a runner and a necessary number of gates through which a fluidic resin is injected into the cavity. The number, the positions and the shapes of the gates are dependent on the shape and such of a product to be molded.

Preferably, the pair of sheet conveying members may be a pair of bendable members, such as a pair of chains, ropes or belts, formed in an endless shape.

The sheet holding means for fixedly holding decorative sheet on the convex, curved parting surface of the female mold has a pressing surface of a shape corresponding to the parting surface of the female mold. The sheet holding means may be a holding frame. The sheet holding means may be driven by a driving force for a molding operation, such as a mold clamping operation, a driving force for driving an ejector pin driving mechanism or an independent driving means, such as a hydraulic actuator. The sheet grippers attached to the sheet conveying members may be closed to grip a decorative sheet and opened to release the decorative sheet by using the sheet holding operation of the sheet holding means, a driving force for driving an ejector pin driving mechanism or an independent driving means, such as a hydraulic actuator.

The decorative sheet may be either a laminate decorative sheet formed by laminating a decorative layer to a base sheet, or a transfer decorative sheet formed by coating a base sheet, with a transfer layer. The laminate decorative sheet is wholly incorporated into a molding by injection molding to complete a product. The transfer decorative sheet is bonded to a molding by injection molding and the base sheet is removed from the molding to leave only the transfer layer on the molding.

The base sheet of the laminate decorative sheet may be a sheet of a thermoplastic resin, such as one of polyolefin resins including polyethylene resins and polypropylene resins, a polyvinyl chloride resin, an acrylic resin, a polystyrene resin, an ABS resin, a polycarbonate resin or a polyester resin. The thickness of the base sheet is in the range of about 20 to 500 μm. The decorative layer may be a layer of a printed pattern, a colored or transparent layer, a metal thin film, or a functional layer, such as a hard paint layer, an antihaze paint layer or a conductive layer.

A transfer decorative sheet is formed by coating a separable base sheet with a transfer layer, such as a pattern layer, and the decorative transfer layer is transferred to a workpiece. When necessary, a release layer may be formed on the base sheet. The transfer layer may include a release layer, a decorative layer, an adhesive layer or the like. A layer other than a decorative layer may selectively used when necessary. The decorative layer may be a layer of a pattern, a partial or full metal thin film or a functional layer, such as a hard paint layer, an antihaze paint layer or a conductive layer. The base sheet may be a flexible thermoplastic resin film, such as a film of a polyamide resin, such as nylon 6 or nylon 66, a film of one of polyolefin resins including a polyethylene resin and a polypropylene resin, or a film of a polyvinyl chloride resin, or may be a laminate, flexible film formed by laminating such flexible thermoplastic resin films.

Resins for forming a molding by sheet-decorating injection molding may be known resins for sheet-decorating injection molding, such as thermoplastic resins including ABS resins (acrylonitrile-butadiene-styrene resins), polystyrene resins, polyvinyl chloride resins, acrylic resins, polycarbonate resins and the like, and unhardened liquid resins including two-component resins and catalytic hardening resins including urethane resins and polyester resins. Suitable one of those resins is used selectively according to the required physical properties and the cost of the product.

BRIEF DESCRIPTION OF THE DRAWINGS

FIG. 2 is a perspective view of a portion of the sheet-decorating injection molding machine shown in FIG. 1 around a female mold;

FIGS. 16 and 17 are a sectional view and a side elevation, respectively, of a female mold and a heating device included in another embodiment according to the present invention; and FIGS. 18A and 18B are perspective views of sheet-decorated moldings (products) formed by the sheet-decorating injection molding machine shown in FIG. 1.

DESCRIPTION OF THE PREFERRED EMBODIMENTS

Preferred embodiments of the present invention will be described hereinafter with reference to the accompanying drawings.

First Embodiment

FIGS. 1 to 15 show a sheet-decorating injection molding machine in a first embodiment according to the present invention.

Figure 1:
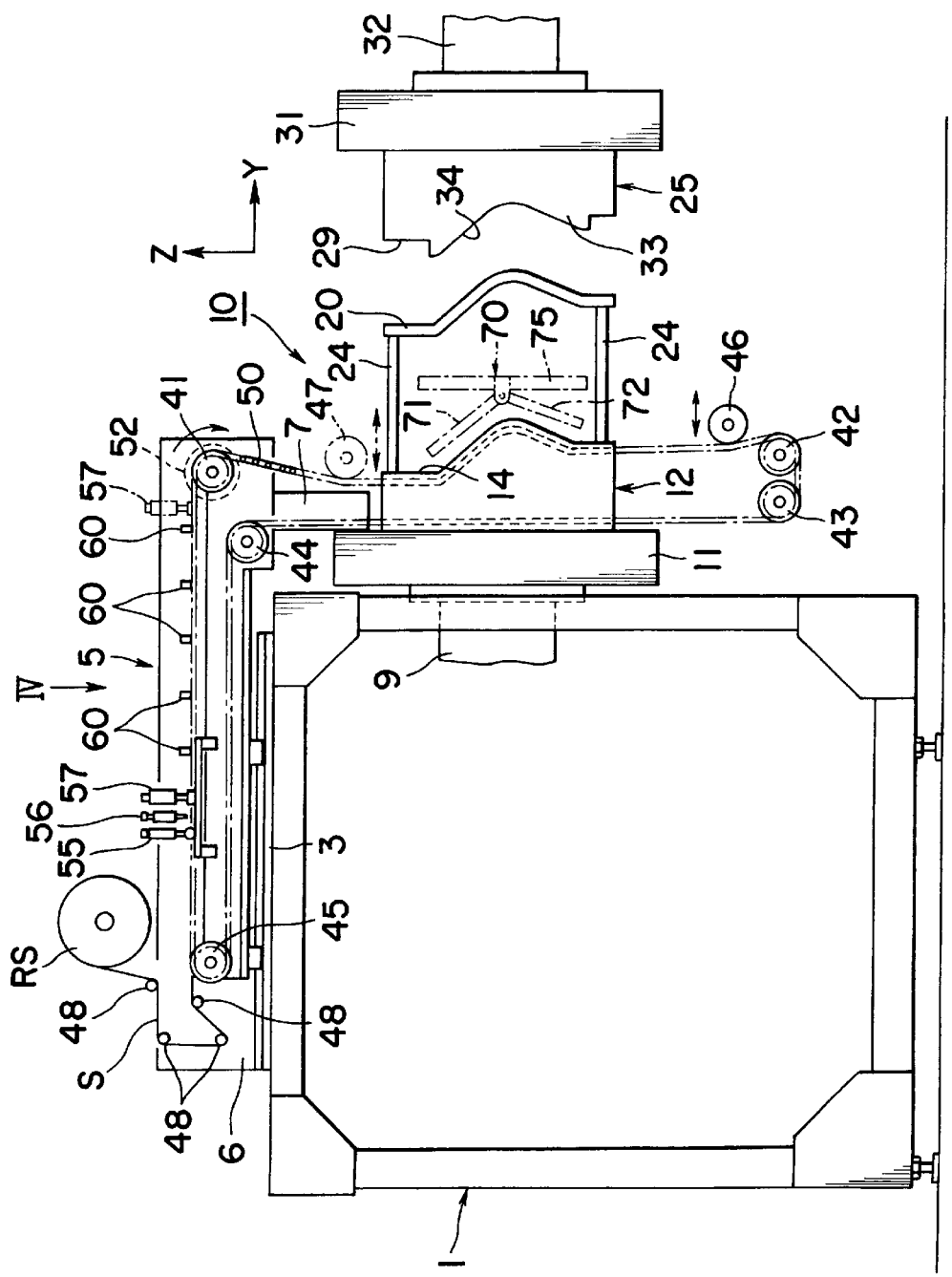
FIG. 1 is a schematic front elevation of a sheet-decorating injection molding machine in a preferred embodiment according to the present invention.
Figure 12:
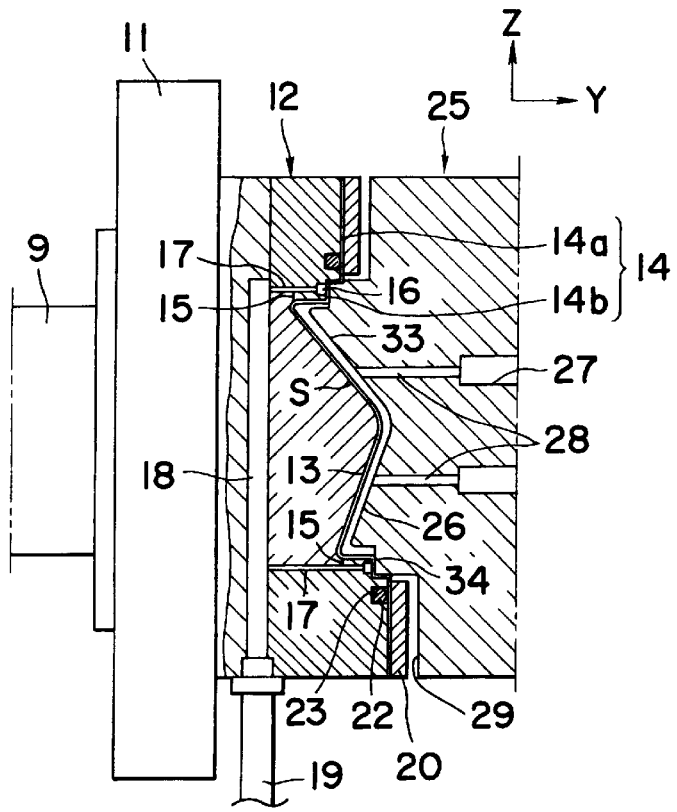
FIG. 12 is a sectional view of assistance in explaining a mold clamping step to be carried out by the sheet-decorating injection molding machine shown in FIG. 1.
Figure 13:
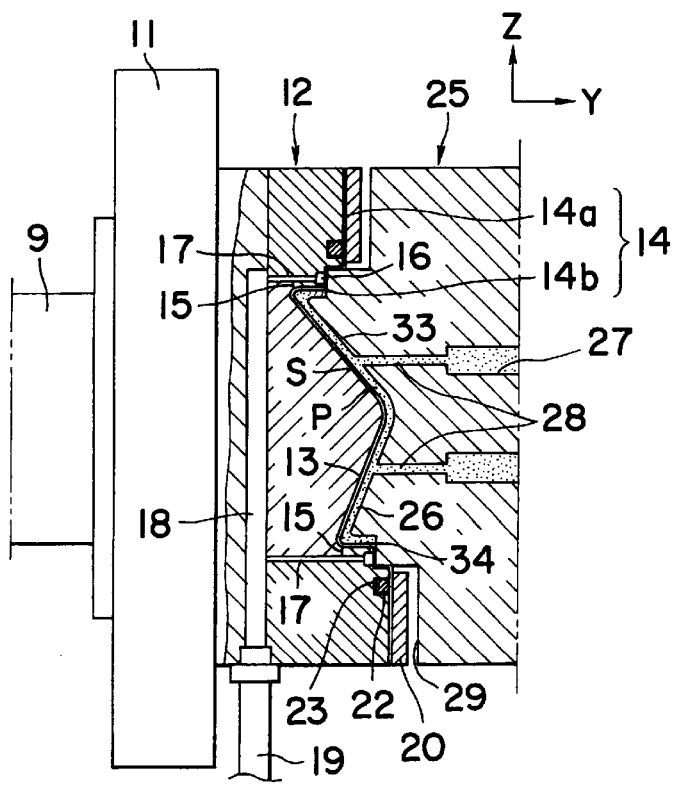
FIG. 13 is a sectional view of assistance in explaining an injection molding step to be carried out by the sheet-decorating injection molding machine shown in FIG. 1.

Referring to FIG. 1, a sheet-decorating injection molding machine 10 embodying the present invention is provided with a female mold 12 and a male mold 25. The female mold 12 has a bottom wall fixed to a platen 11 driven by a ram 9 included in a hydraulic cylinder actuator in horizontal directions, i.e., directions parallel to a Y-axis, to move the female mold 12 toward and away from the male mold 25. The female mold 12 and the male mold 25 are clamped together as shown in FIGS. 12 and 13. Although the female mold 12 is a movable mold in the first embodiment, the male mold 25 may be a movable mold, or the female mold 12 and the male mold 25 may be disposed vertically opposite to each other and either of the female mold 12 and the male mold 25 may be moved vertically.

The female mold 12 is a split mold of an insert construction formed by assembling a plurality of component pieces. The female mold 12 has a hollow 13 having a bottom surface of a substantially V-shaped cross section, and a parting surface 14 surrounding the open end of the hollow 13. As shown in FIGS. 2, 3, 10 and 11, the parting surface 14 is a stepped parting surface consisting of an outer parting surface 14a and an inner parting surface 14b recessed from the outer parting surface 14a. Both the outer parting surface 14a and the inner parting surface 14b are substantially convex, curved surfaces convex toward the male mold 25.

Figure 3:
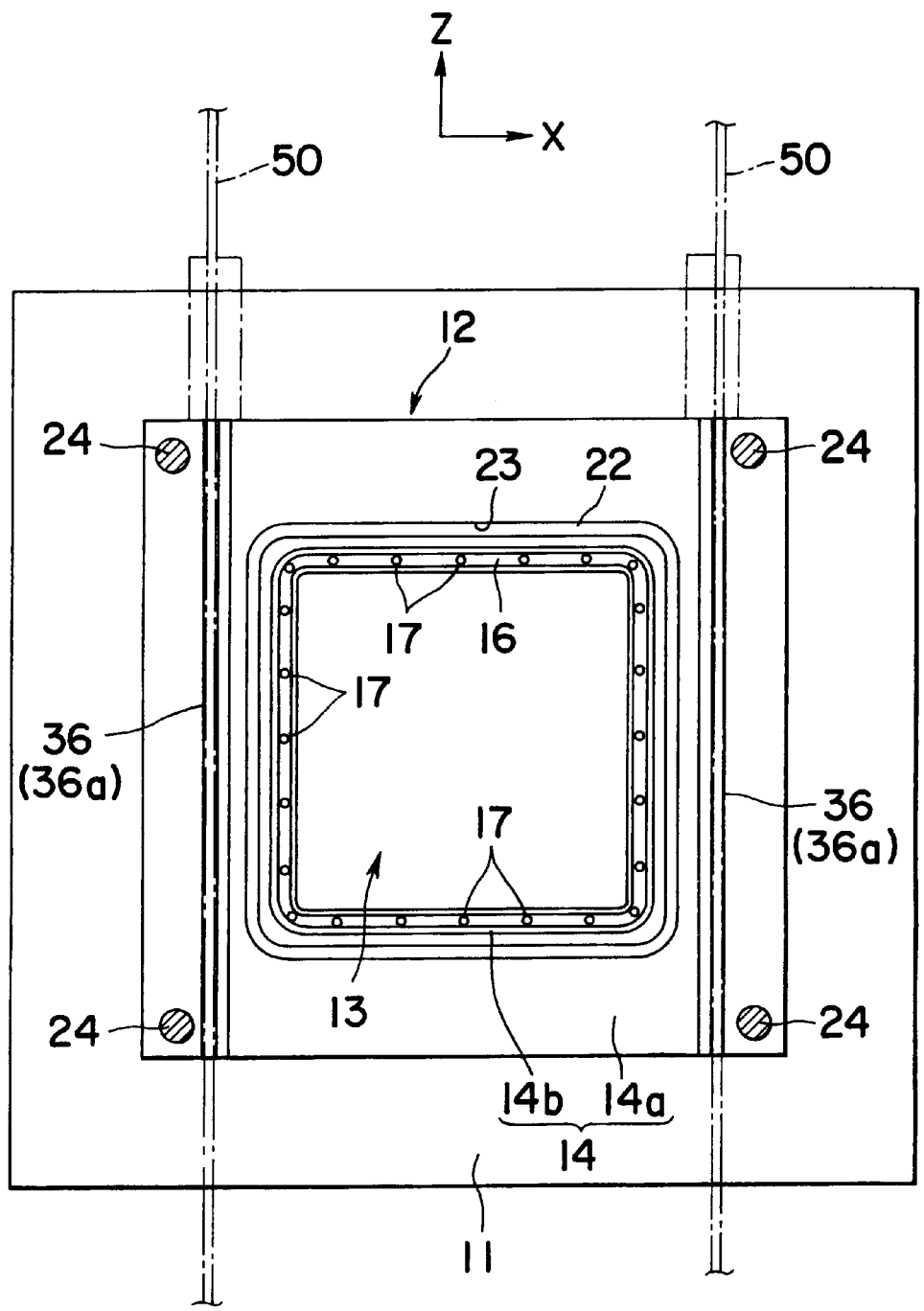
FIG. 3 is a front elevation of a portion of the sheet-decorating injection molding machine shown in FIG. 1 around a female mold.

As shown in FIG. 3, an endless suction groove 16 of a rectangular cross section for attracting a decorative sheet S by vacuum is formed in the inner parting surface 14b of the parting surface 14 so as to surround the open end of the hollow 13. A predetermined number of suction holes 17 are formed at predetermined pitches in the bottom of the suction groove 16.

Figure 10:
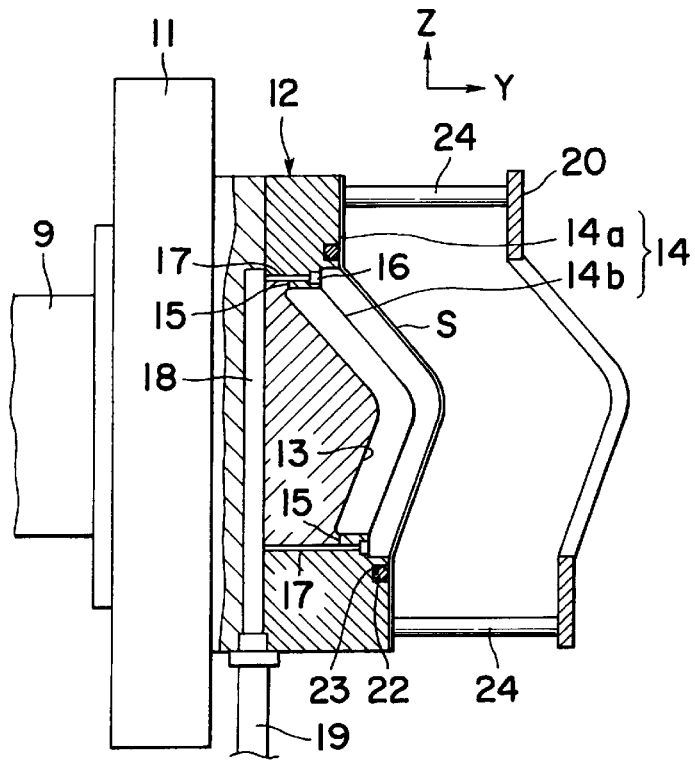

As shown in FIG. 10, narrow gaps 15 serving as a suction slits are formed between the component pieces of the female mold 12. The narrow gaps 15 are opened in the boundaries between the rounded corners of the hollow 13 and flat surface continuous with the rounded corners. The narrow gaps 15 are connected to the suction holes 17. The narrow gaps 15 are opened in the boundaries because marks formed by the narrow gaps 15 serving as suction slits on a sheet-decorated molding p is most obscure when the same are formed in portions of the sheet-decorated molding p corresponding to the rounded corners of the hollow 13. The suction holes 17 opening into the suction groove 16, and the narrow gaps 15 are connected through a suction passage 18 formed in the female mold 12 and a conduit 19 to an external vacuum pump. In the first embodiment, the narrow gaps 15, the suction groove 16, the suction holes 17, the suction passage 18, the conduit 19 and the external vacuum pump constitute a suction system.

An endless groove 23 for receiving an O ring 22 is formed in an inner peripheral part of the outer parting surface 14a of the female mold 12. When the decorative sheet S is pressed against the outer parting surface 14a by a sheet holding member 20, the O ring 22 fitted in the endless groove 23 seals the hollow 13 in an airtight fashion.

The sheet holding member 20 presses the decorative sheet S against the outer parting surface 14a of the female mold 12 and holds the same on the outer parting surface 14a. The sheet holding member 20 is disposed opposite to the outer parting surface 14a. The sheet holding member 20 is curved in a shape corresponding to that of the outer parting surface 14a and is a substantially rectangular frame having a rectangular shape in a front elevation and a shape substantially resembling the letter V in a side elevation. The sheet holding member 20 is connected to four connecting rods 24 axially sidably fitted in through holes formed in the four corners of the female mold 12. A driving mechanism, not shown, drives the connecting rods 24 to move the sheet holding member 20 in directions perpendicular to the parting surface 14 of the female mold 12. As shown in FIG. 12, the male mold 25 is provided with a recess 29 of a depth deep enough to allow the sheet holding member 20 to move away from the female mold 12 to release the decorative sheet S with the female mold 12 and the male mold 25 clamped together.

As shown in FIG. 1, the male mold 25 is fixed to a stationary platen 31 joined to a nozzle included in an injection unit 32. The male mold 25 has a core 33 of a shape complementary to that of the sheet-decorated molding, and a substantially concave parting surface 34 of a V-shape in side elevation. As shown in FIG. 13, the male mold 25 is provided with two runners 27 through which the molten resin P is injected into a cavity formed in the hollow 13 of the female mold 12, and two gates 28 connected to the two runners 27, respectively.

The sheet-decorated molding P to be molded by the sheet-decorating injection molding machine 10 in the first embodiment is a rectangular panel bent substantially in a V-shape as shown in FIG. 18A. The decorative sheet S is a laminate decorative sheet to be entirely incorporated into a resin molding to complete the sheet-decorated molding. The decorative sheet S has a 125 $\mu$m thick base sheet of an acrylic resin, a decorative layer of a 1:1 weight ratio mixture of an acrylic resin and a vinyl chloride-vinyl acetate copolymer formed by gravure printing on the base sheet, and an adhesive layer of a vinyl chloride-vinyl acetate copolymer. The decorative layer (pattern layer) has a woodgrain pattern formed by using three color-galvanoplates. The adhesive layer is formed in 2 $\mu$m in thickness by two-color gravure printing using a solid gravure printing plate of 60 $\mu$m in etching depth and 40 lines/cm in screen rulling.

The sheet-decorating injection molding machine 10 is provided with a sheet feed mechanism (sheet feed means) 5 for feeding the decorative sheet S onto the parting surface 14 of the female mold 12 in addition to the female mold 12, the male mold 25 and the sheet holding member 20.

As shown in FIG. 1, the sheet feed mechanism 5 has a base frame 6 supported for horizontal movement, i.e., movement in directions along the Y-axis, along rails 3 laid on a support structure 1. The base frame 6 is fixedly connected to the movable platen 11 by a connecting member 7. As shown in FIG. 2, the sheet feed mechanism 5 has a pair of support plates 8 extending below the female mold 12 fixed to the movable platen 11 to support two pairs of sprocket wheels 42 and 43 (rotating members). The sheet feed mechanism 5 can be moved together with the female mold 12 in horizontal directions toward and away from the male mold 25.

Figure 4:
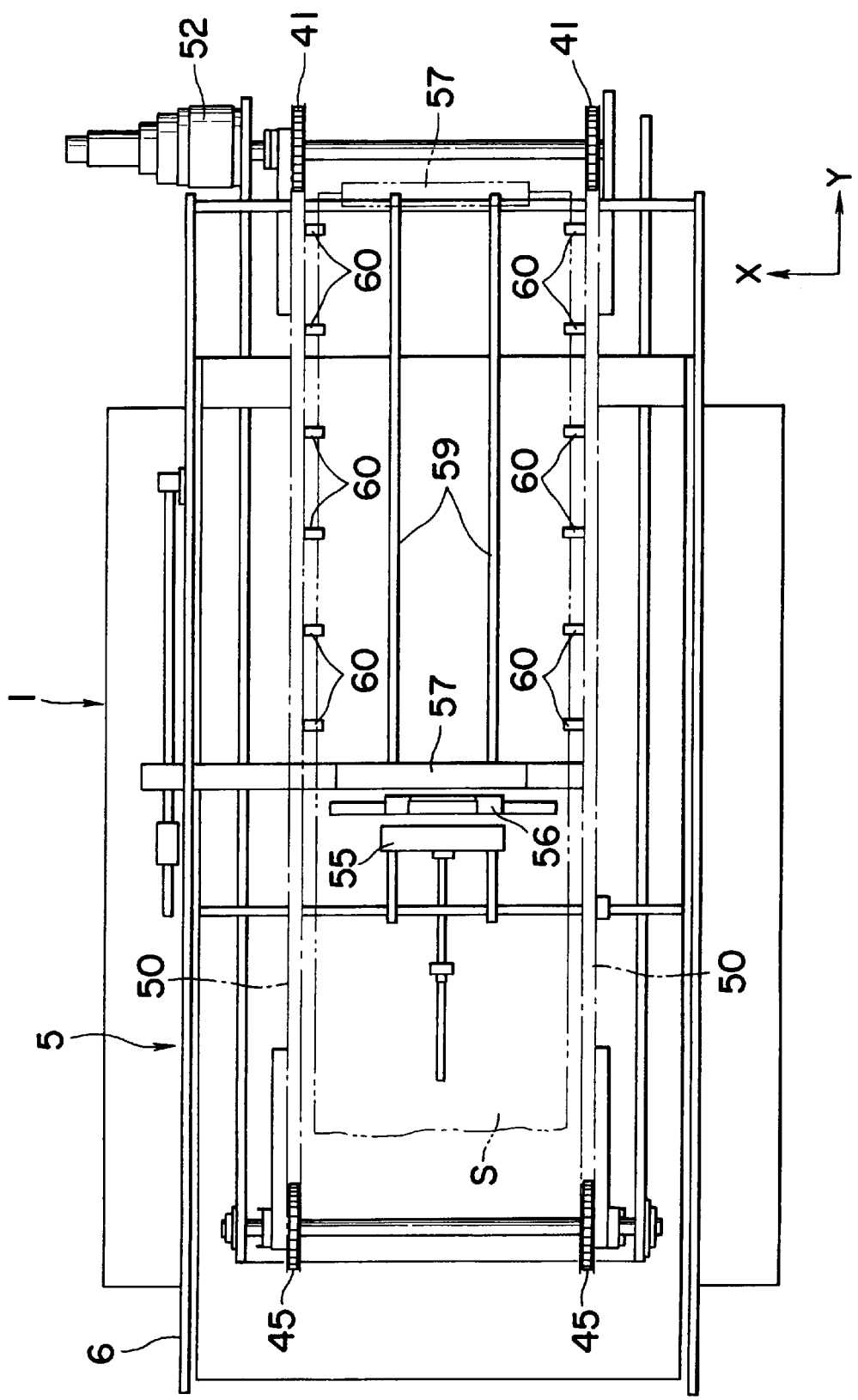
FIG. 4 is a schematic, enlarged plan view taken in the direction of the arrow IV in FIG. 1.

As shown in FIG. 1, a sheet feed device RS supporting a rolled web of decorative sheets S is mounted on the base frame 6. The unwound web of decorative sheets S is fed by the sheet feed device RS through a plurality of guide rollers 48. As shown in FIGS. 1 and 4, two pairs of sprocket wheels 41 and 44 (rotating members) are supported on a front end part, i.e., a right end part on the side of the female mold 12 as viewed in FIG. 1, of the base frame 6, and a pair of sprocket wheels 45 (rotating members) are supported on a rear end part, i.e., a left end part as viewed in FIG. 1, of the base frame 6. One decorative sheet for one injection molding cycle is fed by the sheet feed device RS through the guide rollers 48 onto the parting surface 14 of the female mold 12. The sprocket wheels 41 disposed in the front end part of the base frame 6 are driven for rotation by a stepping geared motor 52. A pair of endless chains (endless members) 50 are wound around the sprocket wheels 41, 44 and 45 arranged along the right side of the base frame 6 and the sprocket wheels 42 and 43 disposed below the right side of the female mold 12, and the sprocket wheels 41, 44 and 45 arranged along the left side of the base frame 6 and the sprocket wheels 42 and 43 disposed below the left side of the female mold 12, respectively. The sprocket wheels 41, 42, 43, 44 and 45, and the stepping geared motor 52 constitute a driving-and-guiding mechanism (driving-and-guiding means).

Figure 6:
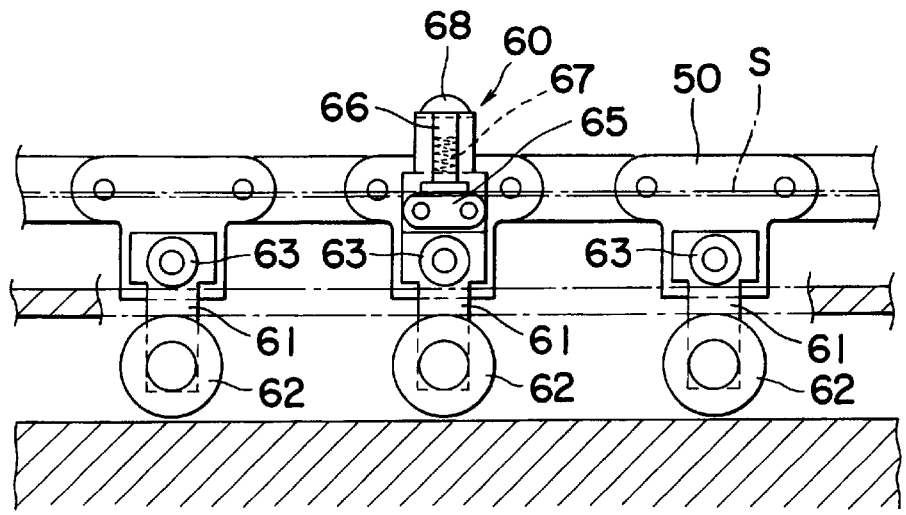
FIG. 6 is an enlarged fragmentary side elevation of an endless chain and a sheet gripper included in the sheet-decorating injection molding machine shown in FIG. 1.
Figure 7:
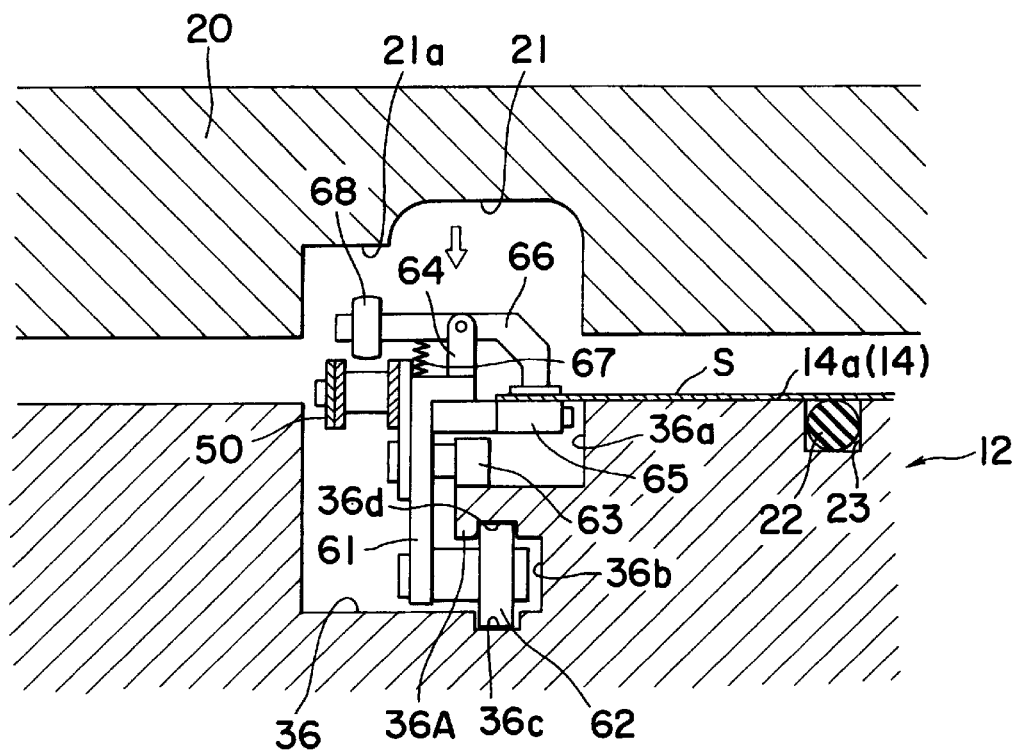
FIG. 7 is an enlarged fragmentary sectional view of assistance in explaining the relation between the endless chain and the sheet gripper, and a guide groove formed in a female mold in the sheet-decorating injection molding machine shown in FIG. 1.

As shown in FIGS. 6 and 7, the endless chains 50 are provided with support members 61 at every two pitches thereof, and larger roller 62 and a smaller roller 63 are supported on each support member 61. A predetermined number of sheet grippers 60 for gripping the opposite side edge parts of the decorative sheet S are supported at a predetermined pitches, such as at five pitches of the endless chains 50, above the support members 61. The sheet grippers 60 are arranged in a predetermined sheet holding section of each of the pair of endless chains 50 so as to hold a length of the decorative sheet S for one injection molding cycle.

The driving-and-guiding mechanism including the sprocket wheels 41, 42, 43, 44 and 45 and the stepping geared motor 52 of the sheet feed mechanism 5 is capable of moving the sheet holding sections, i.e., the sections in which the sheet grippers 60 are arranged to grip the decorative sheet S, of the endless chains 50 between a waiting position in the base frame 6 disposed above the female mold 12, and a sheet feed position directly opposite the parting surface 14 of the female mold 12.

More specifically, a length of the web of decorative sheets S corresponding to a decorative sheet for one injection molding cycle is fed by the sheet feed device RS and is pulled out from a sheet holding mechanism 55 mounted on the base frame 6 in a direction parallel to the Y-axis to the waiting position by a sheet pulling mechanism 57 which slides along a pair of rails 59. The sheet pulling mechanism 57 grips a leading edge part of the decorative sheet S as shown in FIG. 2. The predetermined number of sheet grippers 60 supported on the endless chains 50 grip the opposite side edge parts of the decorative sheet S, and the decorative sheet S is cut off the web of decorative sheets S by a sheet cutter 56. The decorative sheet S for one injection molding cycle is conveyed to the sheet feed position directly opposite the parting surface 14 of the female mold 12. Then, the sheet holding member 20 presses the decorative sheet S against and fixedly holds same on the parting surface 14 of the female mold 12. Then the endless chains 50 are reversed to return the sections of the same supporting the sheet grippers 60 to the waiting position.

Figure 5:
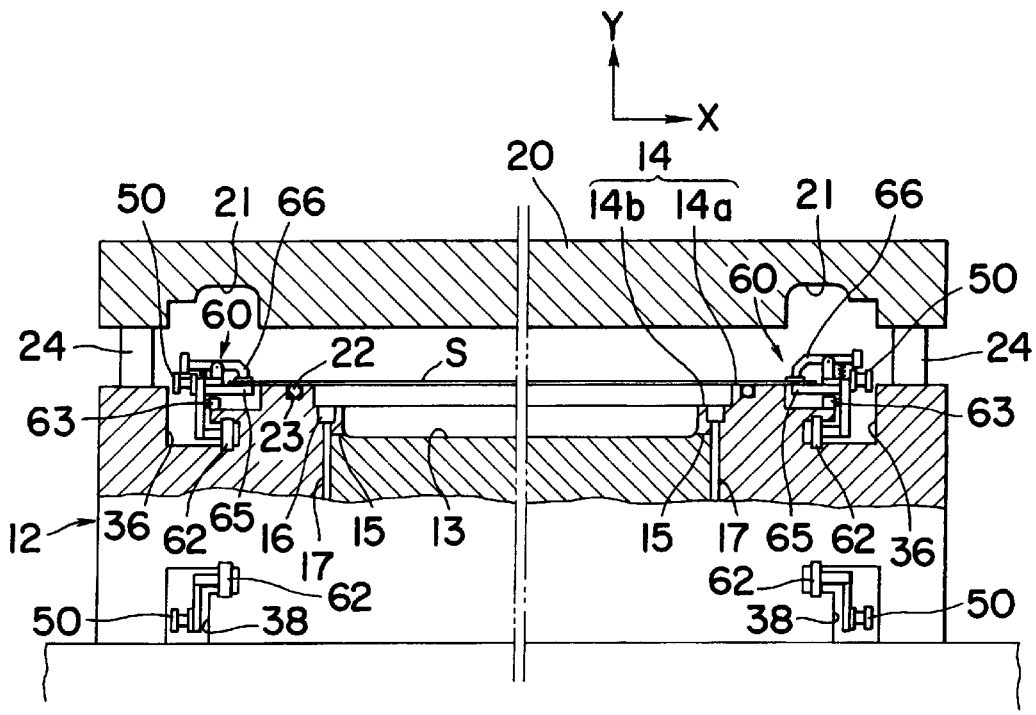
FIG. 5 is a horizontal sectional view of a portion the sheet-decorating injection molding machine shown in FIG. 1 around a female mold.

Referring to FIGS. 2, 3 and 5, the female mold 12 is provided in its front surface apart from the movable platen 11 with a pair of forward guide grooves 36 for guiding the pair of endless chains 50, the larger roller 62 and the smaller roller 63. The forward guide grooves 36 extend vertically, i.e., in a direction along the Z-axis, and are curved in conformity with the outer parting surface 14a. A pair of backward guide grooves 38 are formed in the bottom surface of the female mold 12 to guide the endless chains 50 and the larger rollers 62. The backward guide grooves 38 are straight and extend vertically.

Figure 8:
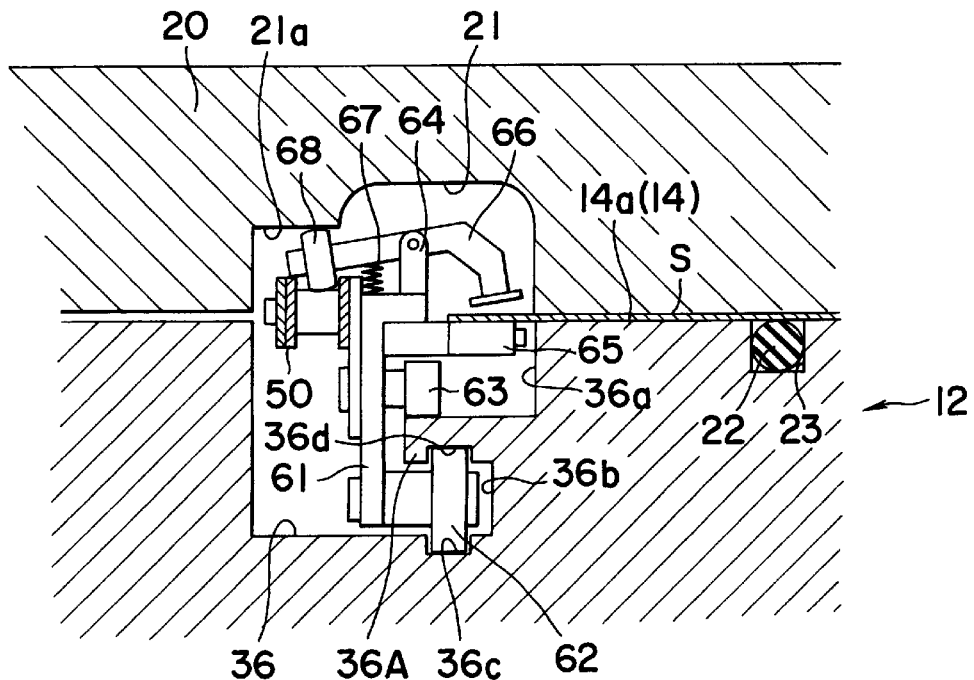
FIG. 8 is an enlarged fragmentary sectional view of assistance in explaining the operation of the endless chain and the sheet gripper in the sheet-decorating injection molding machine shown in FIG. 1.

The forward guide grooves 36 have a cross section of a shape capable of restraining the endless chains 50 and the sheet grippers 60 from movement in directions perpendicular to a sheet conveying direction, i.e., directions parallel to the X- and the Y-axis. More concretely, as shown in FIGS. 7 and 8, a middle wall 36A projects horizontally outward into each of the forward guide grooves 36, the larger rollers 62 and the smaller rollers 63 supported on the endless chain 50 roll along the lower and the upper surface, respectively, of the middle wall 36A. Positioning grooves 36c and 36d are formed in the bottom surface of the forward guide groove 36 and the lower surface of the middle wall 36A, respectively. The larger rollers 62 are loosely fitted in the guide positioning grooves 36c and 36d. An open groove 36a opening into the parting surface 14 is formed on the upper side of the middle wall 36A. Stationary gripping members 65 included in the sheet grippers 60 are projected into the open groove 36a. The positioning grooves 36c and 36d and the middle wall 36A restrain the movement of the endless chains 50 and the sheet grippers 60 in directions, i.e., horizontal and vertical directions as viewed in FIGS. 7 and 8, perpendicular to the sheet conveying direction, i.e., a direction along the substantially convex, curved parting surface 14.

Each sheet gripper 60 has the stationary gripping member 65 laterally projecting from an upper part of the support member 61 so as to be in contact with the back surface of the decorative sheet S, and a movable gripping member 66 pivotally supported on a support plate 64 so as to extend in a plane above the parting surface 14. The movable gripping member 66 is biased by a compression coil spring 67 in a direction to grip the decorative sheet S between the stationary gripping member 65 and the movable gripping member 66. The decorative sheet S gripped by the sheet grippers 60 is moved substantially along the convex, curved parting surface 14 of the female mold 12. The gripping parts of the stationary gripping members 65 and the movable gripping members 66 may be provided with mating teeth or minute embossed protrusions and hollows, respectively, to grip the decorative sheet S firmly.

A roller 68 is supported for rotation on one end part of each movable gripping member 66 opposite a gripping end part of the same. When the sheet holding member 20 presses the decorative sheet S against and hold the same on the parting surface 14 of the female mold 12, a cam surface 21a defining a part of a relief recess 31 formed in the sheet holding member 20 presses the roller 68 to turn the movable gripping member 66 against the resilience of the compression coil spring 67 to separate the gripping end part of the movable gripping member 66 from the griping end part of the stationary gripping member 65 as shown in FIG. 8 and, consequently, the decorative sheet S is released from the sheet grippers 60. The support plate 64, the movable gripping member 66, the compression coil spring 67 and the roller 68 constitute a sheet releasing means which cooperates with the sheet holding member 20 to release the decorative sheet S from the sheet gripper 60.

As shown in FIG. 1, the endless chains 50 are tensioned properly by a pair of tension sprocket wheels 46 disposed below the female mold 12 and pressed against the endless chains 50. The tension of the endless chains 50 is adjusted by adjusting the position of the tension sprocket wheels 46 with respect to directions along the Y-axis relative to the endless chains 50. Thus, the respective positions of the endless chains 50 and the sheet grippers 60 relative to the forward guide grooves 36 of the female mold 12 are determined. Tension sprocket wheels 47 may be disposed above, i.e., on the upstream side, of the female mold 12 as indicated by imaginary lines in FIG. 1.

In the sheet-decorating injection molding machine 10 in the first embodiment, it is undesirable to use a heating device having a flat heating surface for heating and softening the decorative sheet S fixedly held on the parting surface 14 by the sheet holding member 20 because the parting surface 14 of the female mold 12 is a substantially convex, curved surface. Accordingly, the sheet-decorating injection molding machine 10 employs a heating device 70 as shown in FIGS. 14 and 15.

Figure 14:
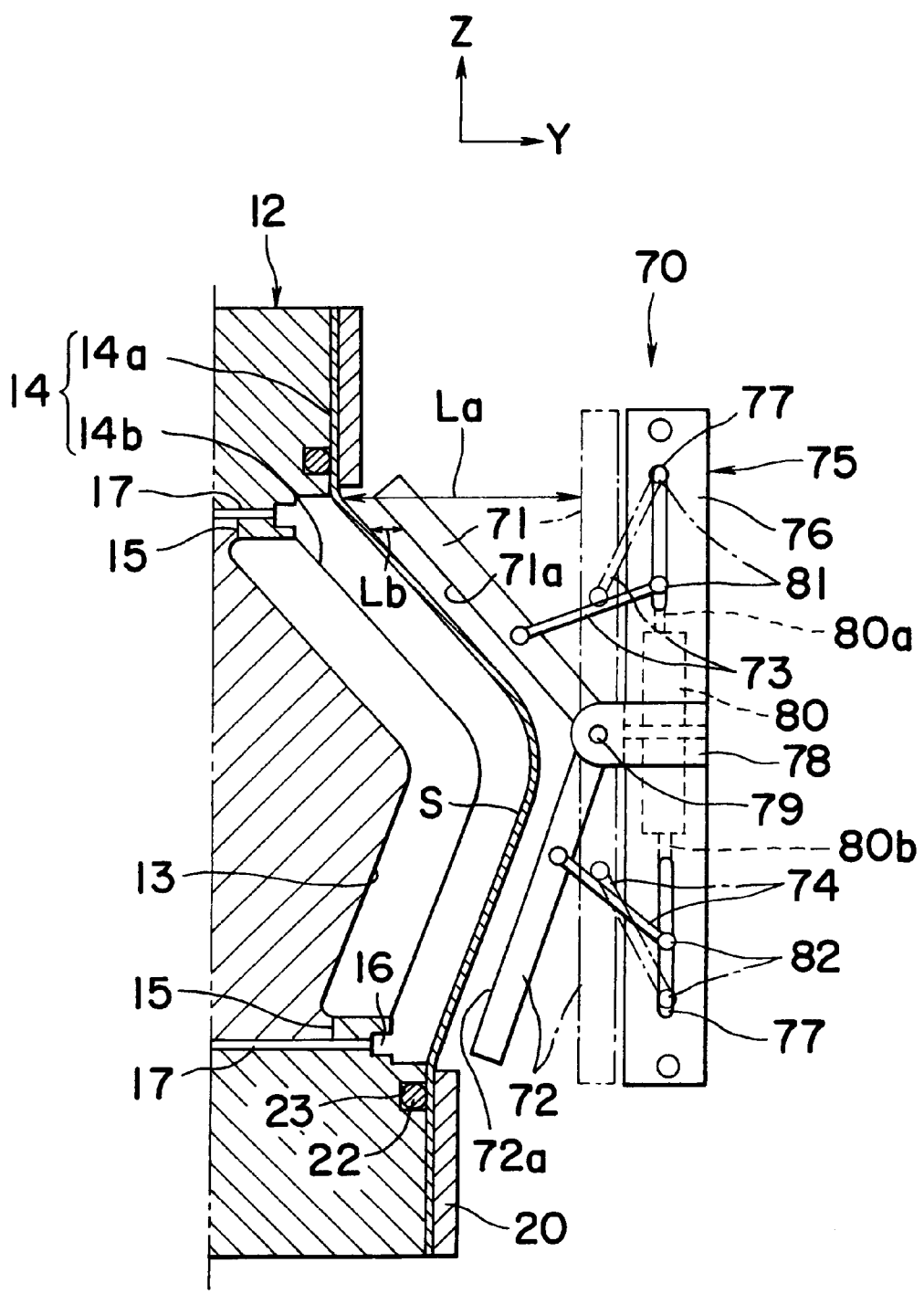
FIGS. 14 and 15 are a side elevation and a perspective view, respectively, of a heating device included in the sheet-decorating injection molding machine shown in FIG. 1.
Figure 15:
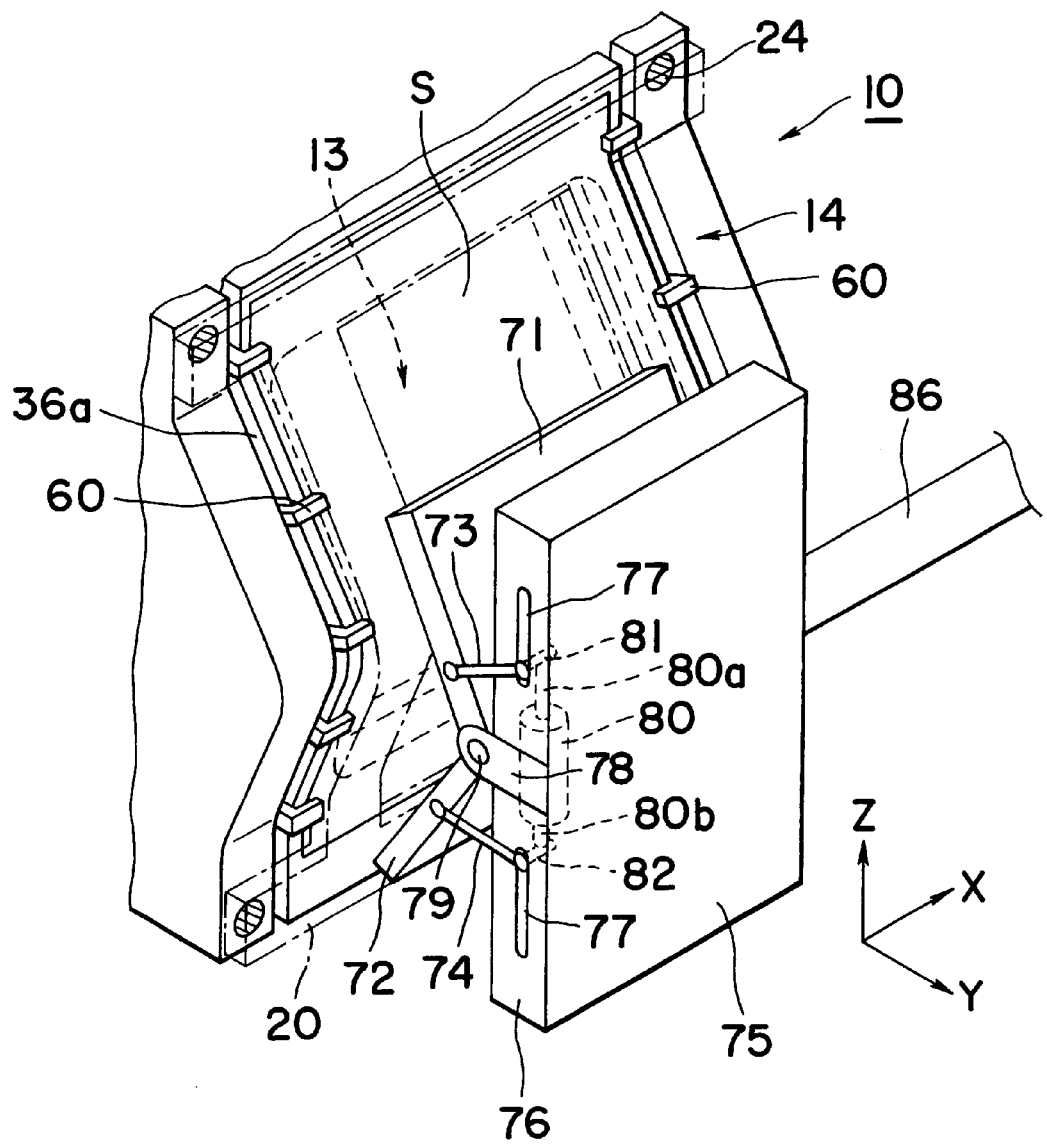

Referring to FIGS. 14 and 15, the heating device 70 comprises a flat, rectangular holding case 75, brackets 78 attached to the respective middle parts of the side walls of the holding case 75, a first heating plate 71 and a second heating plate 72. The first heating plate 71 and the second heating plate 72 are supported by hinges 79 on the brackets 78 so as to turn on the brackets 78. The holding case 75 is joined to the extremity of, for example, a piston rod 86 included in a hydraulic cylinder actuator, i.e., a driving means, The hydraulic cylinder actuator moves the holding case 75 horizontally in directions parallel to the X-axis to move the holding case 75 toward and away from the parting surface 14 of the female mold 12. One end of a link 73 is connected pivotally to a middle part of a side surface of the first heating plate 71, and one end of a link 74 is connected pivotally to a middle part of a side surface of the second heating plate 72. The other ends of the links 73 and 74 are connected pivotally to the extremities of piston rods 80a and 80b included in a pneumatic cylinder actuator 80 fixedly disposed in the holding case 72 by connecting members 81 and 82, respectively. The connecting members 81 and 82 pivotally connecting the links 73 and 74 to the extremities of the piston rods 80a and 80b slide along slots 77 formed in the side wall of the holding case 75.

The piston rods 80a and 80b of the pneumatic cylinder actuator 80 are biased outward by a biasing means, such as a coil spring. When the heating device 70 is held at a waiting position on one side of the female mold 12 with respect to a direction parallel to the X-axis, the piston rods 80a and 80b are at their outermost positions. In this state, the first heating plate 71 and the second heating plate 72 lie like a single flat plate in a plane as indicated by imaginary lines in FIG. 14. When the heating device 70 is advanced to a heating position for heating the decorative sheet S held on the substantially convex, curved parting surface 14 of the female mold 12, the piston rods 80a and 80b are retracted to their innermost positions. Consequently, the first heating plate 71 and the second heating plate 72 are turned on the hinges 79 in opposite directions, respectively, so as to extend at an appropriate angle to each other substantially along the decorative sheet S substantially in a V-shape.

Since the first heating plate 71 and the second heating plate 72 are thus extended at an appropriate angle to each other substantially along the decorative sheet S substantially in a V-shape, the distance Lb between an upper edge part (lower edge part) of the decorative sheet S and the heating surfaces 71a and 72a is far less than the distance La by which the heating surface of a conventional flat heating plate may be spaced from the upper edge part (lower edge part) of the decorative sheet S, and the heating device 70 is able to heat the decorative sheet S more uniformly than the conventional heating device having a flat heating surface, so that the range of temperature distribution in the decorative sheet S heated by the heating device 70 is narrower than that in the decorative sheet S heated by the conventional heating device. When a heating device having a flat heating plate is employed, a ridge portion, i.e., a protruding middle portion, of the decorative sheet S is close to the heating surface of the heating device, while the upper edge portion (lower edge portion) of the decorative sheet S is far from the heating surface of the heating device. When the heating device 70 is used, the difference between the maximum and the minimum distance between the heating surfaces 71*a* and 72*a* of the heating plates 71 and 72, and the decorative sheet S is very small, the decorative sheet S can be drawn uniformly because the decorative sheet S is heated uniformly and, consequently, a pattern formed on the decorative sheet S is scarcely distorted and is scarcely dislocated from a correct position on a resin molding.

The operation of the sheet-decorating injection molding machine 10 in the first embodiment thus constructed will be described below.

The rolled web of decorative sheets S is unwound by the sheet feed device RS disposed obliquely above the female mold 12 on an upstream side with respect to the sheet conveying direction, the sheet grippers 60 supported on the pair of endless chains 50 grip the opposite side edge parts of a decorative sheet S for one injection molding cycle, and the sheet cutter 56 cuts the decorative sheet S from the web on the side of the sheet feed device RS.

The pair of endless chains 50 are wound around the right and the left set of the sprocket wheels 41, 42, 43, 44 and 45 so that sections of the pair of endless chains 50 extend through the forward guide grooves 36 and the backward guide grooves 38, respectively. At this stage, the sheet grippers 60 are at the waiting position apart from the female mold 12 as shown in FIGS. 1 and 2.

Figure 9:
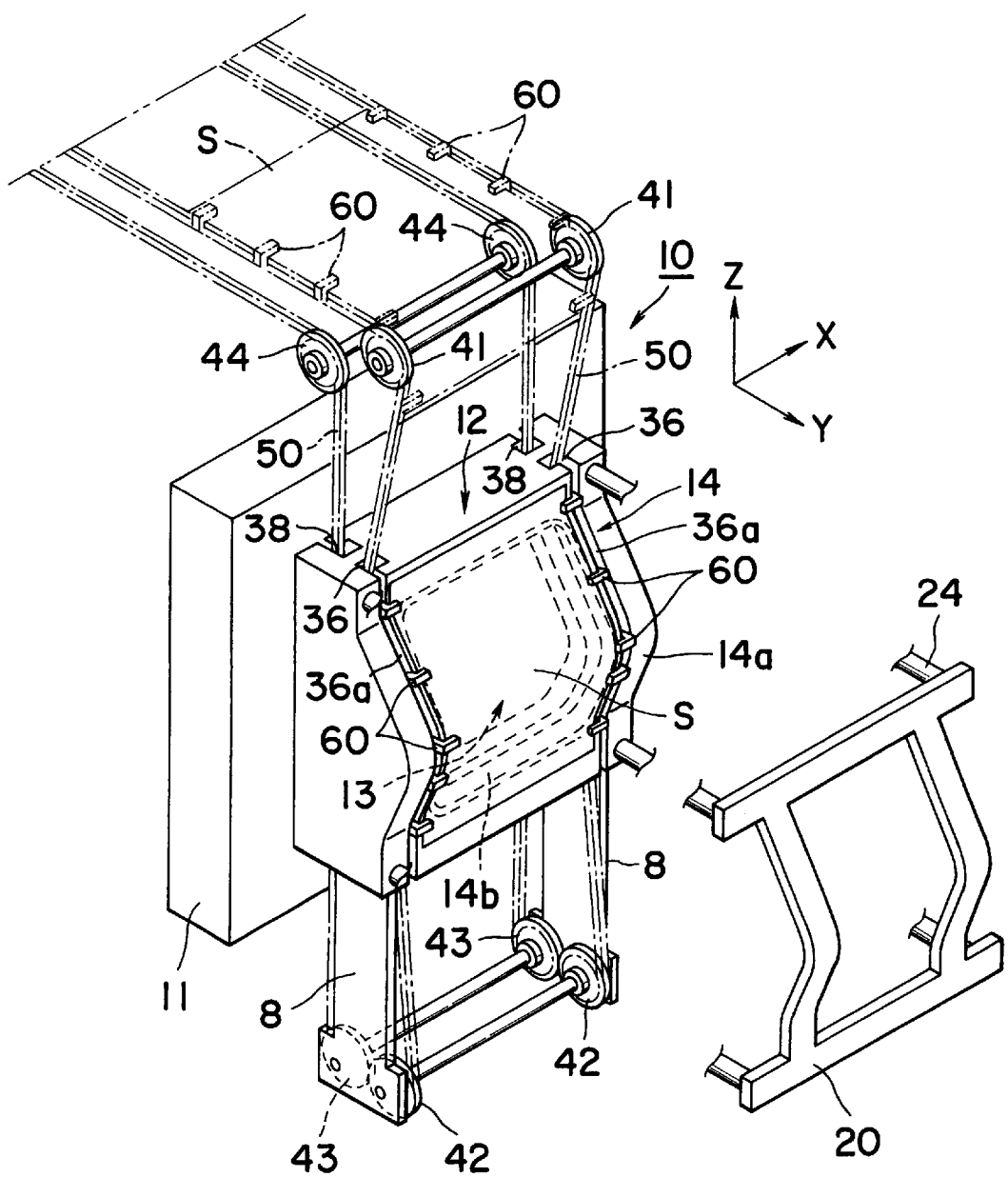
FIGS. 9 and 10 are a perspective view and a sectional view, respectively, of assistance in explaining a sheet feeding step and a sheet holding step to be carried out by the sheet-decorating injection molding machine shown in FIG. 1.

Then, the output shaft of the stepping geared motor 52 is driven for rotation in the normal direction (forward direction) by a 35 predetermined number of turns to rotate the sprocket wheels 41, 42, 43, 44 and 45 in the normal direction to turn the endless chains 50 in the normal direction. Thus, the sheet grippers 60 each having the stationary gripping member 65 and the movable gripping member 66 are moved onto the parting surface 14 as the larger rollers 623 and the smaller rollers 63 are moved into the forward guide grooves 36 formed so as to conform to the parting surface 14, more specifically, the outer parting surface 14*a* to position the decorative sheet S gripped by the sheet grippers 60 so as to extend along the convex, curved parting surface 14 of the female mold 12 as shown in FIGS. 9 and 10; that is, the sheet grippers 60 are moved from the waiting position to the sheet feed position.

Subsequently, the sheet holding member 20 fixedly holds the decorative sheet S on the outer parting surface 14*a* of the female mold 12 (sheet holding step). When the sheet holding member 20 is moved for a sheet holding operation to hold the decorative sheet S fixedly on the outer parting surface 14*a* of the female mold 12 by the sheet holding member 20, the sheet grippers 60 are opened to release the decorative sheet S. As shown in FIGS. 7 and 8, the rollers 68 supported on the movable gripping members 66 of the sheet grippers 60 are pressed by the cam surface 21*a* defining a part of the relief recess 31 formed in the sheet holding member 20. Consequently, the movable gripping members 66 are separated from the corresponding stationary gripping members 65 against the resilience of the compression coil springs 67 to release the decorative sheet S from the sheet grippers 60.

After the decorative sheet S held on the outer parting surface 14*a* has thus been released from the sheet grippers 60, the stepping geared motor 52 is reversed to rotate the sprocket wheels 41, 42, 43, 44 and 45, and the endless chains 50 in the reverse direction, whereby the larger rollers 62 and the smaller rollers 63 are moved backward out of the forward guide grooves 36 formed along the parting surface 14 (the outer parting surface 14*a*) of the female mold 12 to return the sheet grippers 60 each having the stationary gripping member 65 and the movable gripping member 66 to the waiting position. Then, a decorative sheet S for the next injection molding cycle is pulled out and is gripped by the sheet grippers 60.

Figure 11:
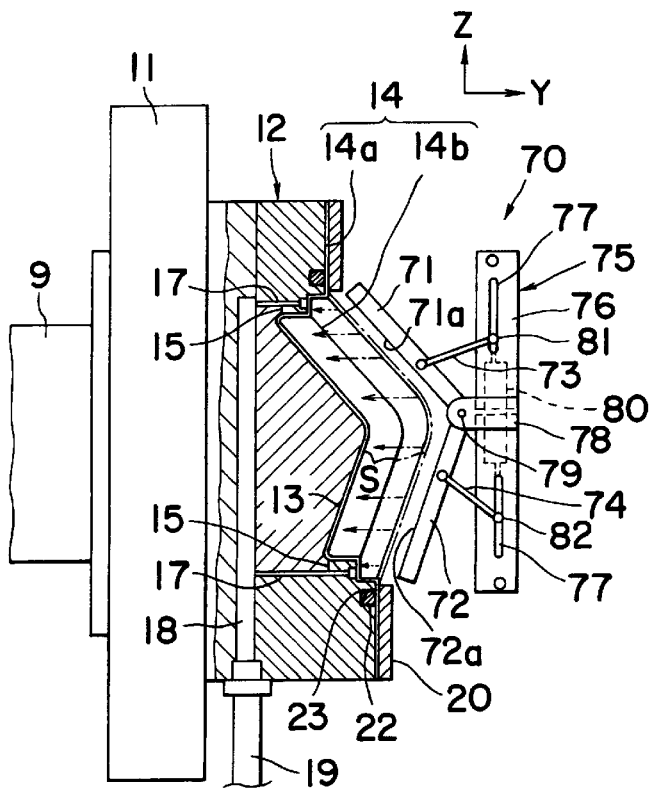
FIG. 11 is a sectional view of assistance in explaining a hot softening step to be carried out by the sheet-decorating injection molding machine shown in FIG. 1.

With the decorative sheet S released from the sheet grippers 60 held on the outer parting surface 14*a* of the female mold 12 by the sheet holding member 20, the heating device 70 is advanced from the waiting position to the heating position directly opposite the decorative sheet S and the first heating plate 71 and the second heating plate 72 are turned so that the heating surfaces 71*a* and 72*a* thereof extend along the outer parting surface 14*a* as shown in FIG. 11. Then, the decorative sheet S is heated and softened by the heating device 70 (heating and softening step). Subsequently, the decorative sheet S is attracted to the inner parting surface 14*b* and the surface of the hollow 13 of the female mold 12 by suction produced by sucking air through the suction holes 17 and the gaps 15 (drawing step).

Then, a known mold clamping operation is carried out to move the female mold 12 toward and join the same to the male mold 25 as shown in FIG. 12. When the female mold 12 is thus moved, the sheet feed mechanism 5 moves together with the female mold 12. Then, an injection molding step is carried out to inject a fluidic resin (molten resin) P through the runners 27 and the gates 28 formed in the male mold 25 into a cavity defined by the female mold 12 and the male mold 25 as shown in FIG. 13. After the molten resin P injected into the cavity has solidified in a resin molding, a mold opening step to open the mold by moving the female mold 12 away from the male mold 25, a sheet trimming step to remove unnecessary portions of the decorative sheet S bonded to the resin molding are trimmed off the decorative sheet S, and an ejecting step to eject a sheet-decorated resin mold, i.e., a product having a shape as shown in FIG. 18A, from the female mold 12 are carried out sequentially.

In the sheet-decorating injection molding machine 10 in the first embodiment, the parting surface 14 of the female mold 12 has the substantially convex, curved surface, and the sheet feed mechanism 5 moves the decorative sheet S so as to extend along the parting surface 14 of the female mold 12. Therefore, the depth of the hollow 13 of the female mold 12 from the parting surface 14 need not be very great even if the surface of the resin mold to be molded is curved in large curvatures like the surface of an article formed by deep drawing. Accordingly, the decorative sheet S is scarcely creased, strained and torn, the decorative sheet S can be extended so as to extend in close contact with the surface of the hollow 13 without reducing molding conditions including conditions for heat and pressure, and a product of a satisfactory quality can be produced with reliability.

Since the decorative sheet S is conveyed and fed by gripped the decorative sheet S by the sheet grippers 60 attached to the endless chains 50, i.e., sheet conveying members, and the endless chains 50 are driven and guided by the sprocket wheels 41, 42, 43, 44 and 45, i.e., driving-and-guiding means, the endless chains 50, i.e., the sheet conveying members, can properly be tensioned, and hence the endless chains 50 and the sheet grippers 60 supported on the endless chains 50 can exactly be positioned relative to the forward guide grooves 36 of the female mold 12. Consequently, the collision of the endless chains 50 or the sheet grippers 60 against the edges of the forward guide grooves 36 of the female mold 12 or the interference between the endless chains 50 or the sheet grippers 60, and the edges of the forward guide grooves 36 of the female mold 12 can effectively be avoided, the endless chains 50 can stably be guided by the forward guide grooves 36 and hence the decorative sheet S can smoothly and quickly be fed.

Since the sheet feed mechanism 5 is able to move together with the female mold (movable mold) 12 when the female mold 12 is moved toward the male mold (stationary mold) 25 for mold clamping and moved away from the male mold 25 for mold opening, the endless chains 50 and the sheet grippers 60 supported on the endless chains 50 are able to move into and move out of the forward guide grooves 36 of the female mold 12 even if the female mold 12 is dislocated from the correct initial position (open position), so that the decorative sheet S can smoothly and stably be fed.

Thus, the sheet-decorating injection molding machine 10 in the first embodiment is capable of stably and efficiently feeding the decorative sheet S, of preventing the excessive displacement and distortion of the decorative sheet during the sheet drawing step even if the female mold 12 has a generally convex, curved parting surface 14 and of smoothly and quickly feeding the decorative sheet S.

Second Embodiment

A sheet-decorating injection molding machine in a second embodiment according to the present invention will be described hereinafter with reference to FIGS. 16 and 17, in which parts like or corresponding to those of the first embodiment shown in FIGS. 1 to 15 are designated by the same reference characters and the description thereof will be omitted.

A female mold 12 included in a sheet-decorating injection molding machine 10 in the second embodiment has a parting surface 14 having substantially convex, curved sections and substantially concave, curved sections. More specifically, the parting surface 14 consists of an outer parting surface 14a having a substantially convex, curved section 14a' and a substantially concave, curved section 14a", and an inner parting surface 14b having a substantially convex, curved section 14b' and a substantially concave, curved section 14b".

Although a heating device 70 may be of the same shape as that shown in FIGS. 11, 14 and 15, it is preferable that the heating device 70 has in addition to a first heating plate 71 and a second heating plate 72, a third heating plate 71' connected to the free end of the first heating plate 71 to form a heating surface of a shape conforming to the concave, curved sections 14a" and 14b" as shown in FIG. 16. The third heating plate 71' has a heating surface 71a' inclined in a direction reverse to that in which the heating surface 71a of the first heating plate 71 corresponding to the convex, curved sections 14a' and 14b' is inclined.

The heating surfaces 71a, 71a' and 72a of the heating device 70 can be set at substantially equal distances from the concave, curved sections 14a" and 14b" and the convex, curved sections 14a' and 14b' of the parting surface 14, and hence the heating device 70 having the first heating plate 71, the second heating plate 72 and the third heating plate 71' as shown in FIG. 16 which can be disposed as mentioned above is capable of more accurately and more uniformly heating a decorative sheet S extended along the concave, curved sections 14a" and 14b" and the convex, curved sections 14a' and 14b' of the parting surface 14 than the heating device 70 shown in FIG. 11.

In the heating device 70 shown in FIG. 16, the angle between the heating surfaces 71a and 71a' increases with the increase of the respective depths of the concave, curved sections 14a" and 14b" of the parting surface 14. Therefore, the thickness of the heating device 70 cannot sufficiently be reduced by turning the first heating plate 71 and the second heating plate 72 toward a holding case 75 when moving the heating device 70 away from the space between the female mold 12 and the male mold 25 to its waiting position.

If the heating surface 71a' of the third heating plate 71' needs to be inclined at a large angle to the heating surface 71a of the first heating plate 71, the third heating plate 71' is pivotally joined to the free end of the first heating plate 71 by a hinge 85, one end of a link 73 is pivotally connected to a middle part of a side surface of the first heating plate 71, and one end of another link 73' is pivotally connected to a middle part of a side surface of the third heating plate 71'. The other ends of the links 73 and 73' are pivotally connected to a piston rod 80a of a pneumatic cylinder actuator 80 fixedly disposed in the holding case 72 by connecting members 81 and 81', respectively. The connecting members 81 and 81' pivotally connecting the links 73 and 73' to the piston rod 80a slide along a vertical slot 77 formed in the side wall of the holding case 75. When the first heating plate 71 and the second heating plate 72 are turned toward hating positions, the angle between the heating surface 71a of the first heating plate 71 and the heating surface 71a' of the third heating plate 71' is increased to set the heating plates 71, 71' and 72 in positions indicated by continuous lines in FIG. 17. When the heating device 70 is held at the waiting position, the links 73 and 73' are turned toward the holding case 75 to set the heating plates 71, 71' and 72 straight as indicated by imaginary lines in FIG. 17.

A sheet-decorated resin molding (product) molded by the sheet-decorating injection molding machine in the second embodiment is a panel rectangular in plane and having a substantially wavy cross section as shown in FIG. 18B.

What is claimed is:

1. A sheet-decorating injection molding machine comprising:

a female mold having a hollow and a parting surface surrounding the hollow;

a male mold opposite the female mold to hold a decorative sheet between the female mold and the male mold and provided with a gating system through which a molten resin is injected into a cavity defined by the female mold and the male mold;

sheet feed means for feeding a decorative sheet onto the parting surface of the female mold so as to cover the hollow of the female mold, wherein the sheet feed means comprises (1) a pair of sheet conveying endless annular members extended on opposite sides of a sheet feed passage, respectively, (2) a driving-and-guiding means driving and guiding the sheet conveying members so that at least the sheet gripping members of the sheet grippers travel along the parting surface of the female mold, the means having a plurality of rotating members around which the endless annular members are wound, and (3) sheet grippers attached to the sheet conveying members to grip the opposite side edge parts of a decorative sheet; and sheet holding means for holding a decorative sheet on the parting surface of the female mold, wherein the parting surface of the female mold include a substantially convex, curved section, and the sheet feed means moves a decorative sheet so that the decorative sheet extends along the parting surface of the female mold.

2. The sheet-decorating injection molding machine according to claim 1, wherein the driving-and-guiding means of the sheet feed means reciprocates the sheet conveying members between a waiting position where the sheet grippers are positioned apart from the female mold, and a feed position where the sheet grippers are located on the parting surface of the female mold.

3. The sheet-decorating injection molding machine according to claim 1, wherein the sheet feed means is fixed to the female mold for travel together with the female mold.

4. The sheet-decorating injection molding machine according to claim 1, wherein the female mold is provided with a pair of guide grooves extending along the parting surface, and the sheet conveying members move along the guide grooves.

5. The sheet-decorating injection molding machine according to claim 4, wherein the guide grooves have a cross section of a shape corresponding to that of a cross section of the sheet conveying members to restrain the sheet conveying members from movement in directions perpendicular to a sheet conveying direction.

6. The sheet-decorating injection molding machine according to claim 1, further comprising tensioning means for tensioning the sheet conveying members in a predetermined tension.

7. The sheet-decorating injection molding machine according to claim 6, wherein the tensioning means includes rotating members pressed against the sheet conveying members.

8. The sheet-decorating injection molding machine according to claim 1, wherein each of the sheet grippers of the sheet feed means is provided with sheet releasing means which cooperates with the sheet holding means to make the sheet gripper release a decorative sheet.

9. The sheet-decorating injection molding machine according to claim 8, wherein the driving-and-guiding means of the sheet feed means moves the sheet conveying members backward to a waiting position apart from the female mold in a state where the decorative sheet is held on the parting surface of the female mold after the sheet grippers have released the decorative sheet.

10. The sheet-decorating injection molding machine according to claim 1, further comprising a heating device having a heating surface of a shape corresponding to the substantially convex, curved section of the parting surface of the female mold, and capable of being disposed opposite to the parting surface so as to face a decorative sheet fed onto the parting surface of the female mold.

11. The sheet-decorating injection molding machine according to claim 1, wherein the parting surface of the female mold has a substantially concave, curved section in addition to the substantially convex, curved section.

12. The sheet-decorating injection molding machine according to claim 11, further comprising a heating device capable of being disposed opposite to the parting surface of the female mold and having a heating surface corresponding to the substantially convex, curved section of the parting surface and the substantially concave, curved section of the parting surface of the female mold.

13. A sheet-decorating injection molding machine comprising:
a female mold having a hollow and a parting surface surrounding the hollow;
a male mold opposite the female mold to hold a decorative sheet between the female mold and the male mold and provided with a gating system through which a molten resin is infected into a cavity defined by the female mold and the male mold;
sheet feed means for feeding a decorative sheet onto the parting surface of the female mold so as to cover the hollow of the female mold;
sheet holding means for holding a decorative sheet on the parting surface of the female mold, wherein the parting surface of the female mold includes a substantially convex, curved section, and the sheet feed means moves a decorative sheet so that the decorative sheet extends along the parting surface of the female mold; and
a heating device having a heating surface of a shape corresponding to the substantially convex, curved section of the parting surface of the female mold, and capable of being disposed opposite to the parting surface so as to face a decorative sheet feed onto the parting surface of the female mold, wherein the heating device comprises a first heating plate and second heating plate, each having a heating surface, adjacent ends of the first and second heating plates are joined so that the first and second heating plates are turnable relative to each other to change the angle between the first and second heating plates, the angle between the first and second heating plates adjustable so that the respective heating surfaces of the first and second heating plates are at substantially equal distances from the curved parting surface of the female mold, respectively, and the angle between the first and the second heating plate can be increased to about 180° when the heating device is placed at a waiting position apart from the female mold.

14. A sheet-decorating injection molding machine comprising:
a female mold having a hollow and a parting surface surrounding the hollow;
a male mold opposite the female mold to hold a decorative sheet between the female mold and male molds and provided with a gating system through which a molten resin is injected into a cavity defined by the female and male molds;
sheet feed means for feeding a decorative sheet onto the parting surface of the female mold so as to cover the hollow of the female mold;
sheet holding means for holding a decorative sheet on the parting surface of the female mold, wherein the parting surface of the female mold includes a substantially convex, curved section, and the sheet feed means moves a decorative sheet so that the decorative sheet extends along the parting surface of the female mold; and
a heating device capable of being disposed opposite to the parting surface of the female mold and having a heating surface corresponding to the substantially convex, curved section of the parting surface and the substantially concave, curved section of the parting surface of the female mold, wherein the heating device comprises first heating plate and second heating plates having a heating surface and joined to one end of the first heating plate so that the first and second heating plates are turnable relative to each other to change the angle between the first and second heating plates, and a third heating plate having a heating surface and pivotally joined to the other end of the first heating plate turnable relative to the first heating plate to change the angle between the first and the third heating plate, the angle between the first and the second heating plate adjustable so that the respective heating surfaces of the first and second heating plates are at substantially equal distances from the convex, curved section of the parting surface of the female mold, and the angle between the first and third heating plates can be adjusted so that the respective heating surfaces of the first and third heating plates are at substantially equal distances from the substantially concave, curved section of the parting surface of the female mold when the heating device is at a heating position opposite the parting surface of the female mold, and the angle between the first and second heating plates can be increased to about 180° and the angle between the first and the third heating plate can be decreased to about 180° when the heating device is at a waiting position apart from the female mold.

* * * * *